(12) United States Patent
Sajima et al.

(10) Patent No.: US 10,078,194 B2
(45) Date of Patent: Sep. 18, 2018

(54) OPTICAL FIBER TAPE MANUFACTURING METHOD, ABNORMALITY DETECTION METHOD, AND MANUFACTURING SYSTEM

(71) Applicant: FUJIKURA LTD., Tokyo (JP)

(72) Inventors: Yoshie Sajima, Sakura (JP); Mizuki Isaji, Sakura (JP); Ken Osato, Sakura (JP); Masayoshi Yamanaka, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 176 days.

(21) Appl. No.: 15/033,969

(22) PCT Filed: Oct. 27, 2015

(86) PCT No.: PCT/JP2015/080201
§ 371 (c)(1),
(2) Date: May 3, 2016

(87) PCT Pub. No.: WO2016/121178
PCT Pub. Date: Aug. 4, 2016

(65) Prior Publication Data
US 2016/0356976 A1    Dec. 8, 2016

(30) Foreign Application Priority Data

Jan. 26, 2015 (JP) ................................ 2015-012558

(51) Int. Cl.
*G02B 6/44* (2006.01)
*B29D 11/00* (2006.01)
*G01M 11/08* (2006.01)

(52) U.S. Cl.
CPC ........ *G02B 6/448* (2013.01); *B29D 11/00721* (2013.01); *B29D 11/00951* (2013.01); *G01M 11/088* (2013.01)

(58) Field of Classification Search
None
See application file for complete search history.

(56) References Cited

FOREIGN PATENT DOCUMENTS

| GB | 1305064 A | * | 1/1973 | ............. C03B 37/14 |
| JP | 2012-042354 A | | 3/2012 | |

(Continued)

OTHER PUBLICATIONS

International Preliminary Report on Patentability with translation of Written Opinion dated Aug. 10, 2017, issued by the International Searching Authority in application No. PCT/JP2015/080201.

*Primary Examiner* — Lisa L Herring
(74) *Attorney, Agent, or Firm* — Sughrue Mion, PLLC

(57) ABSTRACT

[Objective] To detect abnormalities in optical fibers by using a phenomenon specific to optical fiber tapes including plural optical fibers arranged parallel to each other and connected together intermittently. [Solution] This optical fiber tape manufacturing method involves: a step of forming connecting parts that connect together adjacent optical fibers among a plurality of optical fibers arranged parallel to each other while applying tension to the optical fibers, and thus forming an optical fiber tape in which the connecting parts are intermittently disposed; a step of reducing the tension applied to the optical fiber tape; and a step of measuring a thickness of the optical fiber tape with reduced tension from a direction parallel to a tape plane on a path of the optical fiber tape.

12 Claims, 11 Drawing Sheets

(56) References Cited

FOREIGN PATENT DOCUMENTS

JP     2012-088445 A    5/2012
JP     2013-250466 A    12/2013

* cited by examiner

OPTICAL FIBER TAPE MANUFACTURING METHOD, ABNORMALITY DETECTION METHOD, AND MANUFACTURING SYSTEM

CROSS REFERENCE TO RELATED APPLICATIONS

This application is a National Stage of International Application No. PCT/JP2015/080201 filed Oct. 27, 2015, claiming priority based on Japanese Patent Application No. 2015-012558 filed Jan. 26, 2015, the contents of all of which are incorporated herein by reference in their entirety.

TECHNICAL FIELD

The present invention relates to an optical fiber tape manufacturing method, an abnormality detection method, and a manufacturing system.

BACKGROUND ART

Patent Literature 1 describes an inspection device and a manufacturing device that inspect a connecting part of an optical fiber tape in which a plurality of optical fibers are arranged parallel to each other and intermittently connected together.

Patent Literature 1 describes that, when manufacturing an optical fiber tape in which a plurality of optical fibers are arranged parallel to each other and intermittently connected together, an adhesive (an ultraviolet curable resin) is applied while passing the plurality of optical fibers through a coating die so as to form connecting parts and non-connecting parts (separated parts) between adjacent optical fibers, and the adhesive is then irradiated with ultraviolet radiation. In the inspection device, abnormalities in the connecting parts of the optical fibers are detected by: separating the non-connecting parts of the optical fibers by supporting the optical fiber tape on a guide roller having stepped parts; and measuring edge spacings, edge counts, etc. of the optical fiber tape.

In the inspection device of Patent Literature 1, in order to inspect the connecting parts of the optical fiber tape having a plurality of optical fibers arranged parallel to each other and intermittently connected, the optical fiber tape is measured from a direction orthogonal to a plane of the tape on a path (line) of the optical fiber tape.

CITATION LIST

Patent Literature

Patent Literature 1: JP 2012-42354 A

SUMMARY OF INVENTION

Technical Problem

When a plurality of optical fibers are passed through respective optical fiber insertion holes of a coating die, the optical fibers encounter resistance and sometimes abnormalities arise in the tension applied to the optical fibers. Abnormalities in the tension applied to the optical fibers may result in a difference between line lengths of the plurality of optical fibers configuring the optical fiber tape. Such a line length difference in the plurality of optical fibers gives rise to differences in signal delay; thus, it is preferable to suppress/prevent line length differences. If manufacturing of the optical fiber tape continues when there is still an abnormality in the tension applied to the optical fibers (i.e., when there is still a line length difference among the plurality of optical fibers), the optical fibers encounter excessive resistance in the coating die, which may result in the optical fibers being damaged, or the optical fibers breaking.

Therefore, when there are abnormalities in the tension applied to the optical fibers during manufacture of an optical fiber tape having a plurality of optical fibers arranged parallel to each other and intermittently connected, it is preferable to be able to swiftly detect such abnormalities. However, with the inspection device of Patent Literature 1, even if abnormalities arise in the tension applied to the optical fiber, such abnormalities are not detectable.

An objective of the present invention is to detect abnormalities in optical fibers by utilizing a phenomenon specific to optical fiber tapes having a plurality of optical fibers arranged parallel to each other and intermittently connected.

Solution to Problem

A primary aspect of the invention for achieving the aforementioned objective is a manufacturing method for an optical fiber tape, the method involving: a step of forming connecting parts that connect together adjacent optical fibers among a plurality of optical fibers arranged parallel to each other while applying tension to the optical fibers, and thus forming an optical fiber tape in which the connecting parts are intermittently disposed; a step of reducing the tension applied to the optical fiber tape; and a step of measuring a thickness of the optical fiber tape with reduced tension from a direction parallel to a tape plane on a path of the optical fiber tape.

Other features of the present invention are made clear by the Description and Drawings below.

Advantageous Effects of Invention

According to the present invention, changes in tape thickness caused by abnormalities in tension applied to optical fibers can be detected during manufacture of an optical fiber tape having a plurality of optical fibers arranged parallel to each other and intermittently connected together.

DESCRIPTION OF EMBODIMENTS

Figure 1:
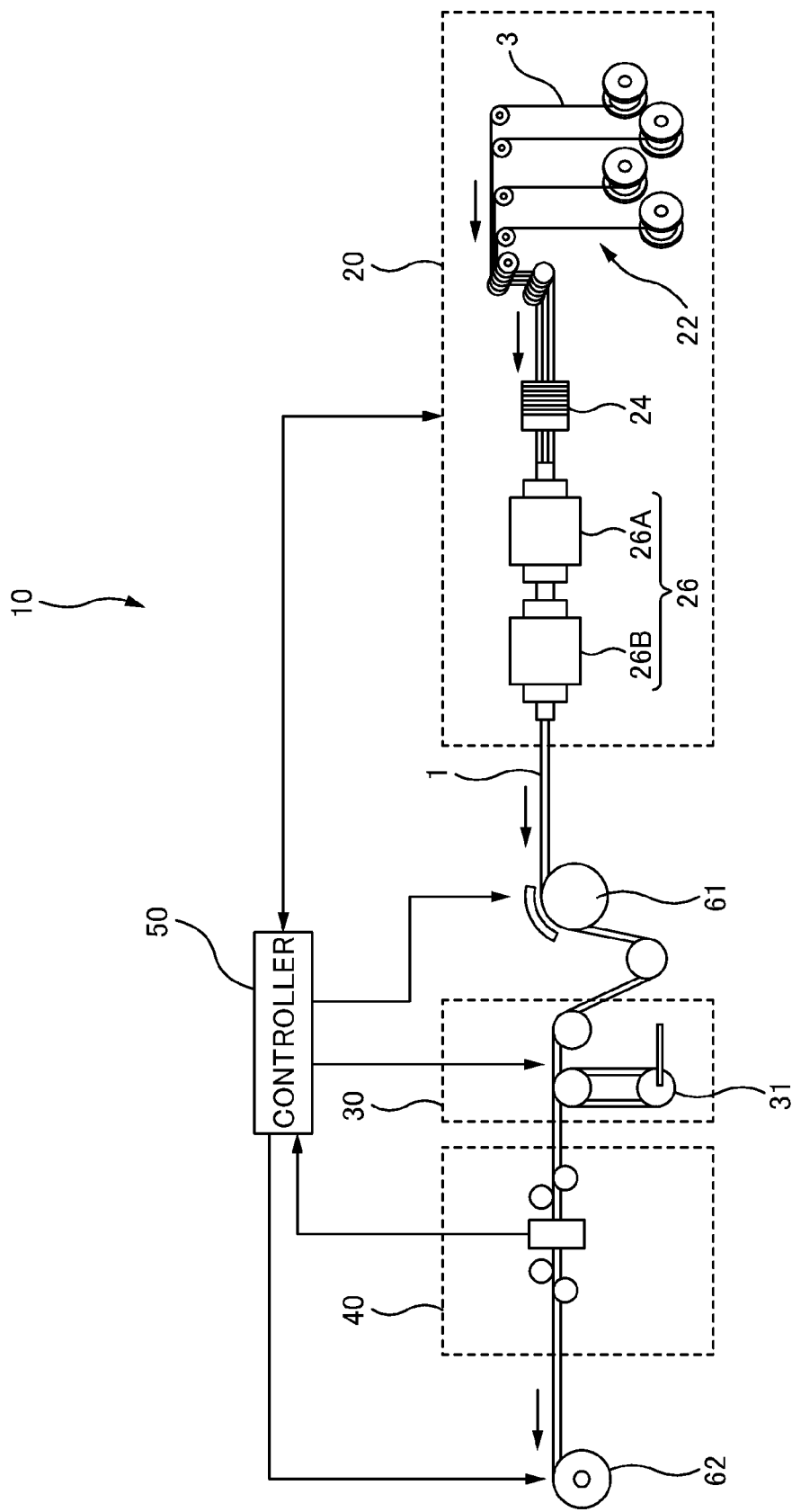
FIG. 1 is an explanatory diagram of a manufacturing system 10 for an intermittently-fixed optical fiber tape 1.

At least the following matters are made clear from the Description and Drawings described below.

Clear disclosure is given of a manufacturing method for an optical fiber tape, the method involving: a step of forming connecting parts that connect together adjacent optical fibers among a plurality of optical fibers arranged parallel to each other while applying tension to the optical fibers, and thus forming an optical fiber tape in which the connecting parts are intermittently disposed; a step of reducing the tension applied to the optical fiber tape; and a step of measuring a thickness of the optical fiber tape with reduced tension from a direction parallel to a tape plane on a path of the optical fiber tape.

Such a manufacturing method enables detection of abnormalities in the optical fibers by utilizing a phenomenon specific to optical fiber tapes in which a plurality of optical fibers are arranged parallel to each other and intermittently connected.

It is preferable that abnormalities in the tension applied to the optical fibers are detected based on the thickness of the optical fiber tape that has been measured. This thereby enables abnormalities in the tension to be detected using a phenomenon specific to optical fiber tapes in which a plurality of optical fibers are arranged parallel to each other and intermittently connected.

It is preferable that abnormalities in line length difference in the plurality of optical fibers configuring the optical fiber tape are detected based on the thickness of the optical fiber tape that has been measured. This thereby enables abnormalities in the line length difference of the optical fibers to be detected using a phenomenon specific to optical fiber tapes in which a plurality of optical fibers are arranged parallel to each other and intermittently connected.

It is preferable that the step of forming the optical fiber tape is controlled based on the thickness of the optical fiber tape that has been measured. Thus, it is possible to suppress/prevent manufacture of optical fiber tapes having abnormalities.

It is preferable that the step of forming the optical fiber tape is stopped based on the thickness of the optical fiber tape that has been measured. Thus, it is possible to suppress/prevent damage to the optical fibers.**

It is preferable that: a pull-in unit is disposed between a tape forming section that forms the optical fiber tape and a tension reducing section that reduces tension applied to the optical fiber tape, the pull-in unit pulling in the optical fiber tape from the tape forming section; and a tension of the optical fiber tape at an upstream side of the pull-in unit is made to be different from a tension of the optical fiber tape at a downstream side of the pull-in unit. This thereby enables tension in the optical fiber tape to be maintained in the tape forming section, even when the tension of the optical fiber tape is reduced by the tension reducing section.

Clear disclosure is given of an abnormality detection method involving: a step of forming connecting parts that connect together adjacent optical fibers among a plurality of optical fibers arranged parallel to each other while applying tension to the optical fibers, and thus forming an optical fiber tape in which the connecting parts are intermittently disposed; a step of reducing the tension applied to the optical fiber tape; a step of measuring a thickness of the optical fiber tape with reduced tension from a direction parallel to a tape plane on a path of the optical fiber tape; and a step of detecting an abnormality in the tension applied to the optical fibers based on the thickness of the optical fiber tape that has been measured.

Such an abnormality detection method enables abnormalities in tension applied to optical fibers to be detected using a phenomenon specific to optical fiber tapes in which a plurality of optical fibers are arranged parallel to each other and intermittently connected.

Clear disclosure is given of an abnormality detection method involving: a step of forming connecting parts that connect together adjacent optical fibers among a plurality of optical fibers arranged parallel to each other while applying tension to the optical fibers, and thus forming an optical fiber tape in which the connecting parts are intermittently disposed; a step of reducing the tension applied to the optical fiber tape; a step of measuring a thickness of the optical fiber tape with reduced tension from a direction parallel to a tape plane on a path of the optical fiber tape; and a step of detecting an abnormality in line length difference in the plurality of optical fibers configuring the optical fiber tape based on the thickness of the optical fiber tape that has been measured.

Such an abnormality detection method enables abnormalities in line length difference of the optical fibers to be detected using a phenomenon specific to optical fiber tapes in which a plurality of optical fibers are arranged parallel to each other and intermittently connected.

Clear disclosure is given of a manufacturing system for an optical fiber tape, the system including: a forming section that forms connecting parts for connecting together adjacent optical fibers among a plurality of optical fibers arranged parallel to each other while applying tension to the optical fibers, and thus forms an optical fiber tape in which the connecting parts are intermittently disposed; a tension reducing section that reduces the tension applied to the optical fiber tape; and a tape thickness measuring section that measures a thickness of the optical fiber tape with reduced tension from a direction parallel to a tape plane on a path of the optical fiber tape.

Such a manufacturing system enables abnormalities in the optical fibers to be detected using a phenomenon specific to optical fiber tapes in which a plurality of optical fibers are arranged parallel to each other and intermittently connected.

EMBODIMENTS

Configuration:

FIG. 1 is an explanatory diagram of a manufacturing system 10 for an intermittently-fixed optical fiber tape 1.

Figure 2:
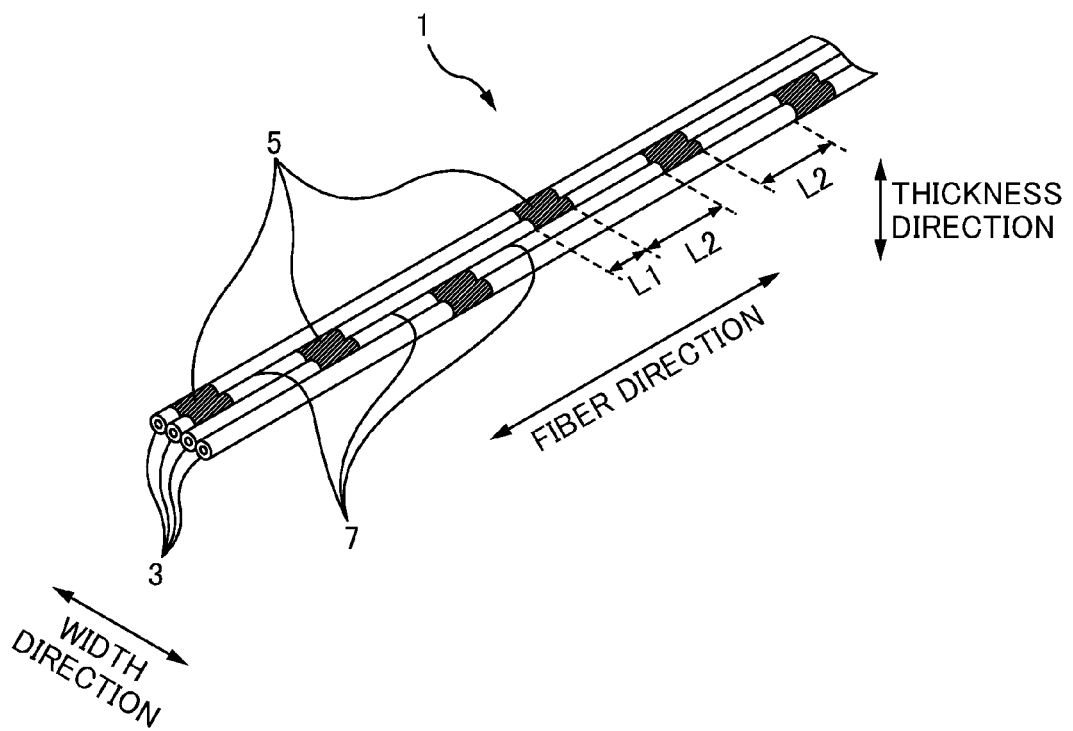
FIG. 2 is an explanatory diagram of an example of an intermittently-fixed optical fiber tape 1.

FIG. 2 is an explanatory diagram of an example of an intermittently-fixed optical fiber tape 1.

In the following explanation, each direction is defined as illustrated in FIG. 2. Namely, a direction parallel to optical fibers 3 configuring an optical fiber tape 1 may be referred to as the "fiber direction", a direction in which the plurality of optical fibers 3 configuring the optical fiber tape 1 are arranged may be referred to as the "tape width direction", and a direction perpendicular to a tape plane of the optical fiber tape 1 may be referred to as the "thickness direction". The feed direction of the optical fiber tape 1 in FIG. 1 is a direction parallel to the fiber direction.

The intermittently-fixed optical fiber tape 1 is an optical fiber tape in which a plurality of the optical fibers 3 are arranged parallel to each other and intermittently connected together. Two adjacent strands of the optical fibers 3 are connected together by connecting parts 5. A plurality of the connecting parts 5 that each connect two adjacent strands of the optical fibers 3 are disposed intermittently along the fiber direction. The plurality of connecting parts 5 of the optical fiber tape 1 are intermittently disposed in two dimensions, along the fiber direction and along the tape width direction. The connecting parts 5 are each formed by applying an ultraviolet curable resin, acting as an adhesive, and then solidifying the ultraviolet curable resin by irradiating with ultraviolet radiation. Note that the connecting parts 5 may be constituted by a thermoplastic resin. Regions other than where there is a connecting part 5 between two adjacent strands of the optical fibers 3 are non-connecting parts 7 (separated parts). At the non-connecting parts 7, the two adjacent strands of the optical fibers 3 are not bound to each other. Thereby, the optical fiber tape 1 is capable of being rolled up into a tube (bundle) or folded onto itself, enabling a high number of optical fibers 3 to be packed at high density.

The intermittently-fixed optical fiber tape 1 is not limited to that illustrated in FIG. 2. For example, the optical fibers 3 may be configured from a different number (for example, 12 strands) of the optical fibers 3. Moreover, the layout of the plurality of intermittently disposed connecting parts 5 may be changed.

As illustrated in FIG. 1, the manufacturing system 10 includes a tape forming section 20, a tension reducing section 30, and a tape thickness measuring section 40. A controller 50 manages control of the manufacturing system 10, and the controller 50 controls the tape forming section 20, the tension reducing section 30, and the tape thickness measuring section 40. The control system 10 includes a pull-in unit 61 (a receiving roller) that pulls in the optical fiber tape 1 from the tape forming section 20, and a take-up unit 62 (a take-up drum) for taking up the optical fiber tape 1. The controller 50 also controls the pull-in unit 61 and the take-up unit 62.

The tape forming section 20 is a device that forms the intermittently-fixed optical fiber tape 1. The tape forming section 20 includes a plurality of optical fiber feeders 22, an adhesive applicator 24, and a light source 26. The optical fiber feeders 22 are supply devices (supply sources) that supply the optical fibers 3 to the adhesive applicator 24. The adhesive applicator 24 is a device that applies an adhesive between the optical fibers 3, and includes a coating die 241 (described later). The light source 26 is a radiating device that radiates ultraviolet radiation. The light source 26 is configured from two types of light source: a semi-curing light source 26A and a full-curing light source 26B.

Figure 3A:
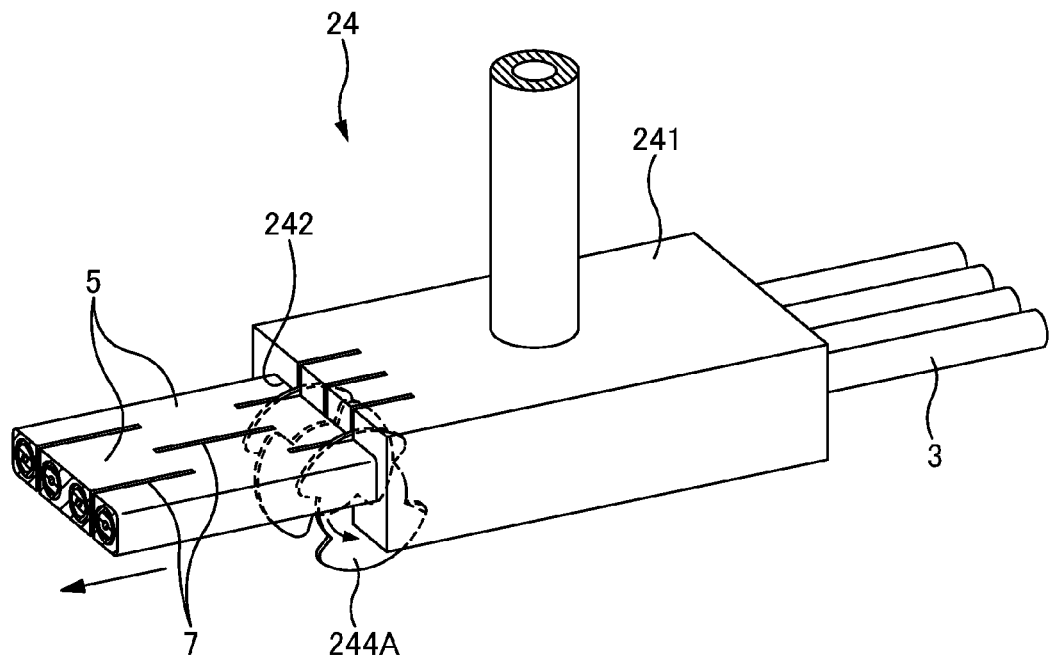
FIG. 3A is an explanatory diagram of a coating die 241 of an adhesive applicator 24.

FIG. 3A is an explanatory diagram of the coating die 241 of the adhesive applicator 24. The coating die 241 is a member that applies an adhesive (in this case an ultraviolet curable resin) between optical fibers 3, and includes a plurality of optical fiber insertion holes 242. The interior space of the coating die 241 is filled with adhesive, and in this interior space, the adhesive is applied between the optical fibers 3. An adhesive removing section 244A is provided as an intermittent applicator 244 in the vicinity of outlets of the optical fiber insertion holes 242 of the coating die 241. The adhesive removing section 244A removes portions of the adhesive applied between the optical fibers 3, while leaving other portions thereof. Accordingly, immediately after exiting from the optical fiber insertion holes 242 of the coating die 241 (i.e., immediately after having passed through the adhesive removing section 244A in the intermittent applicator 244), a state exists in which adhesive is intermittently applied between the optical fibers 3.

Figure 3B:
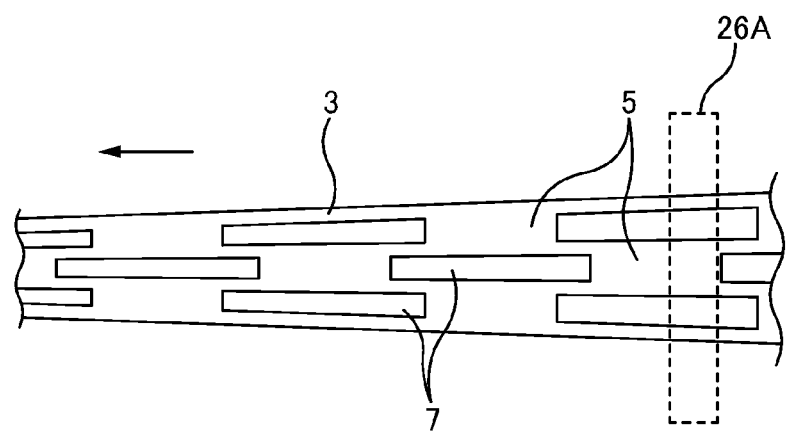
FIG. 3B is an explanatory diagram of line concentration of optical fibers 3 after adhesive application.

FIG. 3B is an explanatory diagram of line concentration of the optical fibers 3 after adhesive application. FIG. 3B shows an exaggeration of spacings between the optical fibers 3, the shape of the removed portions of the adhesive, etc. There are spacings between the respective optical fibers 3 immediately after exiting from the optical fiber insertion holes 242 of the coating die 241, with nothing present at the adhesive-removed portions. The semi-curing light source 26A radiates ultraviolet radiation onto the adhesive in this state, thus semi-curing the ultraviolet curable resin adhesive.

Figure 4:
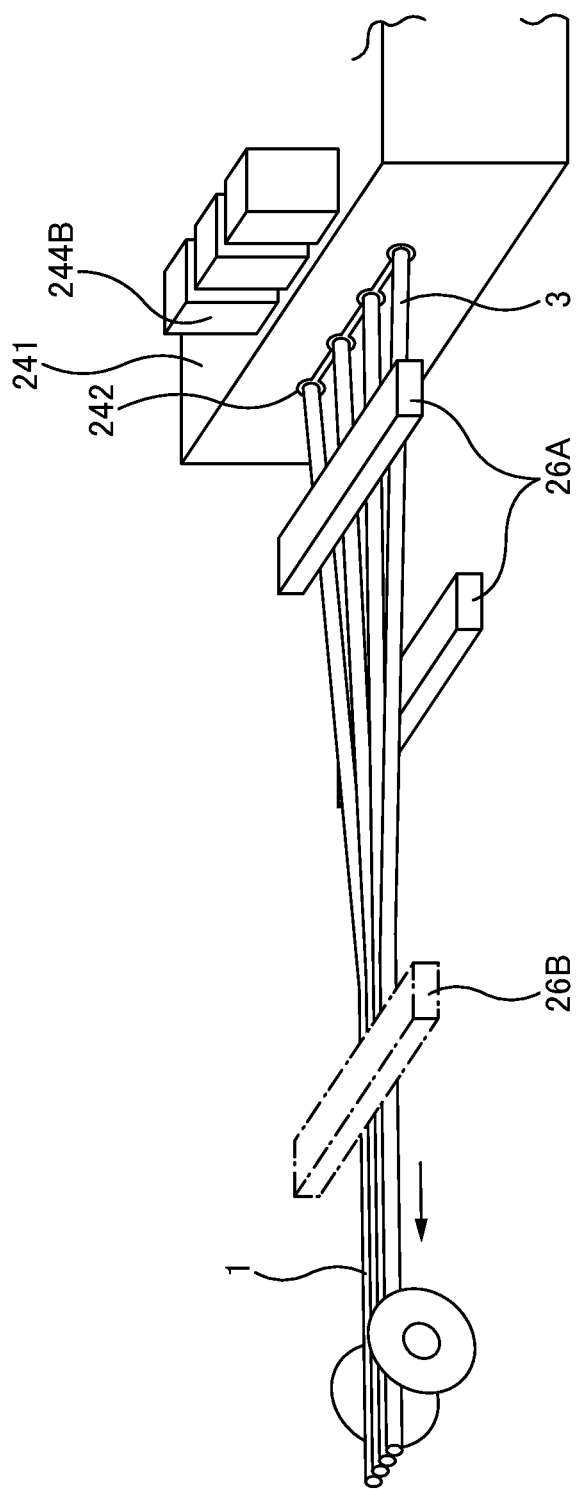
FIG. 4 is an explanatory diagram of another coating die 241.

FIG. 4 is an explanatory diagram of another coating die 241. Shutters 244B are provided as the intermittent applicator 244 at the vicinity of the outlet of the optical fiber insertion holes 242 of the coating die 241. The shutters 244B are members that switch between applying or interrupting the adhesive. The shutters 244B achieve a state in which the adhesive is applied intermittently between the optical fibers 3 by intermittently applying the adhesive between the optical fibers 3. In this case also, there are spacings between the optical fibers 3 immediately after having exited from the optical fiber insertion holes 242 of the coating die 241, and the semi-curing light source 26A radiates ultraviolet radiation onto the adhesive in this state and semi-cures the ultraviolet curable resin adhesive.

Regardless of which coating die 241 among the die of FIG. 3A or the die of FIG. 4 has been employed, the spacings between the optical fibers 3 gradually narrow after the adhesive has been semi-cured, and the plurality of optical fibers 3 are arranged parallel to each other and line-concentrated into a tape shape. Even when the plurality of optical fibers 3 are line-concentrated prior to full curing, the adhesive does not stick together at the adhesive-removed portions because the adhesive has been semi-cured. By emitting ultraviolet radiation from the full-curing light source 26B and curing the adhesive, the intermittently-fixed optical fiber tape 1 illustrated in FIG. 2 is formed.

In the tape forming section 20 described above, the intermittently-fixed optical fiber tape 1 (the optical fiber tape 1 with the intermittently disposed connecting parts 5) is formed by forming the connecting parts 5 connecting the adjacent optical fibers 3 together, while tension is being applied to the plurality of optical fibers 3 arranged parallel to each other. However, the plurality of optical fibers 3 may encounter resistance when the optical fibers 3 pass through the optical fiber insertion holes 242 of the coating die 241, and abnormalities sometimes arise in the tension applied to the optical fibers 3. Examples of causes of the resistance the optical fibers 3 encounter include abnormal contact between the optical fibers 3 and the coating die 241, poor lubricity of the surface of the optical fibers 3, and buildup of waste inside the coating die 241. Examples of causes of abnormal contact between the optical fibers 3 and the coating die 241 include line deviations of the optical fibers 3, the diameter of the optical fibers 3 being too large with respect to the optical fiber insertion holes 242, and the optical fibers 3 becoming inclined with respect to the optical fiber insertion holes 242 due to static electricity.

If abnormalities arise in the tension applied to the optical fibers 3, a difference in line length may occur in the plurality of optical fibers 3 configuring the optical fiber tape 1. Such a line length difference in the plurality of optical fibers 3 gives rise to differences in signal delay; thus, it is preferable to suppress/prevent line length differences. If manufacturing of the optical fiber tape 1 continues when there is still an abnormality in the tension applied to the optical fibers 3 (i.e., when there is still a line length difference present in the plurality of optical fibers), the optical fibers 3 encounter excessive resistance in the coating die 24, which may result in the optical fibers 3 being damaged, or the optical fibers 3 breaking. Thus, when abnormalities have arisen in the tension of the optical fibers 3, it is preferable to be able to swiftly detect such abnormalities.

In the present exemplary embodiment, abnormalities (abnormalities in the tension applied to the optical fibers 3, or the occurrence of a line length difference) are detected by measuring the thickness of the intermittently-fixed optical fiber tape 1 after tension applied to the intermittently-fixed optical fiber tape 1 has been reduced. The following is an explanation regarding reasons that abnormalities can be detected from the thickness of the intermittently-fixed optical fiber tape 1 under reduced tension.

Figure 5:
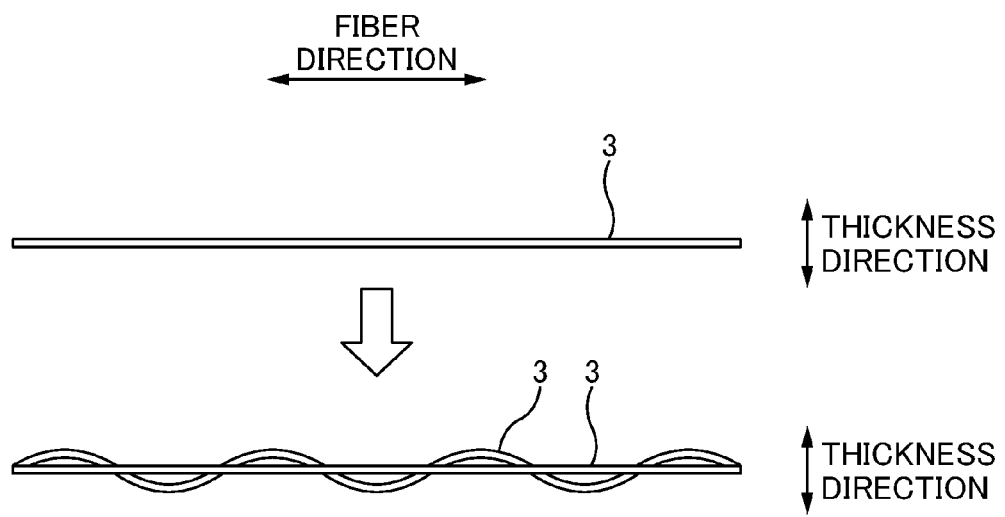
FIG. 5 is an explanatory diagram of a change in thickness of an intermittently-fixed optical fiber tape 1 having a line length difference. The upper part of the diagram is an explanatory diagram in which an intermittently-fixed optical fiber tape 1 is in a state before tension is reduced. The lower part of the diagram is an explanatory diagram in which the intermittently-fixed optical fiber tape 1 is in a reduced tension state.

FIG. 5 is an explanatory diagram of changes to thickness of an intermittently-fixed optical fiber tape 1 having a difference in line length. The upper part of the diagram is an explanatory diagram of the intermittently-fixed optical fiber tape 1 in a state before tension is reduced (i.e., a state under comparatively high tension). The lower part of the diagram is an explanatory diagram of the intermittently-fixed optical fiber tape 1 in a state of reduced tension (i.e., a state under comparatively low tension). Both diagrams are diagrams in which the optical fiber tape 1 is viewed along the tape width direction (a direction parallel to the tape plane of the optical fiber tape 1).

As illustrated at the upper part of the diagram in FIG. 5, even when there is a difference in the line lengths of the optical fibers 3 configuring the intermittently-fixed optical fiber tape 1, each of the optical fibers 3 is stretched out and adopts a straightened state as long as a comparatively high tension is applied to the optical fiber tape 1. In such a state, gaps are not formed between the optical fibers 3, because both the abnormal tension optical fibers 3 and the normal optical fibers 3 adopt a straightened state. It is therefore difficult to observe any line length difference between the optical fibers 3 in this state.

The optical fibers 3 contract when the tension of the optical fiber tape 1 is reduced. When this occurs, the optical fibers 3 that were under abnormal tension contract more than the normal optical fibers 3. As a result, the normal optical fibers 3 deform by warping in the thickness direction when the tension of the optical fiber tape 1 is reduced, as illustrated in the lower part of the diagram in FIG. 5. Thus, when the tension of the optical fiber tape 1 is reduced in cases where there is a difference in line length between the optical fibers 3 of the intermittently-fixed optical fiber tape 1, the intermittently-fixed optical fiber tape 1 will appear thicker as viewed along the tape width direction (a direction parallel to the tape plane of the optical fiber tape 1). This phenomenon is a phenomenon specific to intermittently-fixed optical fiber tapes 1 having intermittently disposed connecting parts 5 (namely, a phenomenon that does not occur in ordinary optical fiber tapes lacking the non-connecting parts 7).

In the present exemplary embodiment, the above characteristic phenomenon of the intermittently-fixed optical fiber tape 1 is utilized to make abnormalities in the optical fibers 3 visible, and to detect any abnormalities. As illustrated in FIG. 1, the manufacturing system 10 of the present exemplary embodiment includes the tension reducing section 30 and the tape thickness measuring section 40 for measuring the thickness of the intermittently-fixed optical fiber tape 1 after tension applied to the intermittently-fixed optical fiber tape 1 has been reduced.

The tension reducing section 30 is a device that reduces the tension applied to the intermittently-fixed optical fiber tape 1. The tension reducing section 30 includes a dancer roller 31. The method of reducing tension in the optical fiber tape 1 is not limited to methods employing the dancer roller 31, and other methods may be employed therefor. The tension reducing section 30 is disposed at the upstream side of the tape thickness measuring section 40, and the optical fiber tape 1, under reduced tension due to the tension reducing section 30, is supplied to the tape thickness measuring section 40.

The pull-in unit 61 (the receiving roller), which pulls in the optical fiber tape 1 from the tape forming section 20, is disposed between the tension reducing section 30 and the tape forming section 20. By pulling in and receiving, with the pull-in unit 61, the optical fiber tape 1 from the tape forming section 20, the tension of the optical fiber tape 1 at the upstream side of the pull-in unit 61 can be made to be different from the tension of the optical fiber tape 1 at the downstream side of the pull-in unit 61. In this way, the tension of the optical fiber tape 1 at the upstream side of the pull-in unit 61 is maintained, even when the tension reducing section 30 reduces the tension of the optical fiber tape 1; thus, the tension on the optical fiber tape 1 (or on the optical fibers 3) is not reduced in the tape forming section 20. Suppose the tension of the optical fiber tape 1 in the tape forming section 20 was to be reduced, then this might lead to problems, such as abnormal contact between the optical fibers 3 and the coating die 241; however, such problems are avoided by the present exemplary embodiment. In the present exemplary embodiment, due to the presence of the pull-in unit 61 (the receiving roller), the tension reducing section 30 acts as a device to reduce the tension of the optical fiber tape 1 on the downstream side of the tension reducing section 30. In other words, the tension reducing section 30 is a device that reduces the tension of the optical fiber tape 1 between the tension reducing section 30 and the take-up unit (the take-up drum).

The tape thickness measuring section 40 is a device that measures the thickness of the optical fiber tape 1. The tape thickness measuring section 40 includes, for example, a CCD sensor 42 and an illuminating device 44, although the illuminating device 44 may be omitted. The CCD sensor 42 may be a one-dimensional sensor (a line sensor), or a two-dimensional sensor (an area sensor). Moreover, the controller 50 may execute part of the functionality for measuring the tape thickness. For example, the controller 50 may measure the thickness of the optical fiber tape 1 by extracting edges of the optical fiber tape 1 (upper edge and lower edge of the optical fiber tape 1) from an image captured by the CCD sensor 42.

Figure 6A:
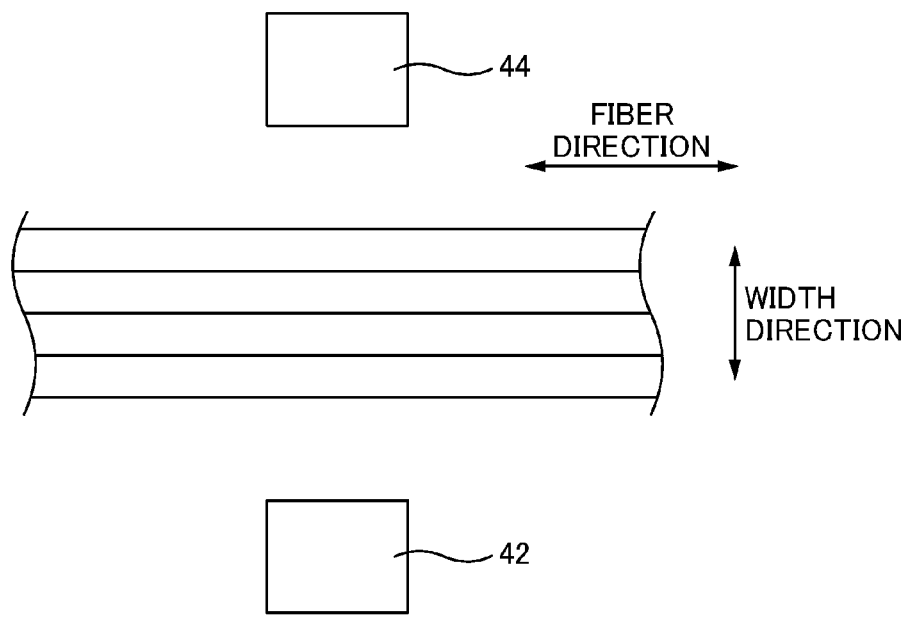
FIG. 6A and FIG. 6B are explanatory diagrams of a positional relationship between a path of an optical fiber tape 1 and a tape thickness measuring section 40.
Figure 6B:
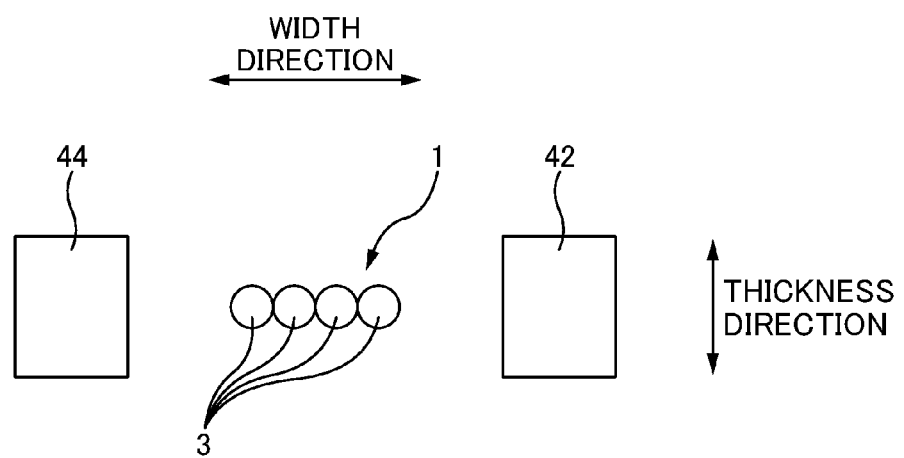

FIG. 6A and FIG. 6B are explanatory diagrams of positional relationships between the path of the optical fiber tape 1 and the tape thickness measuring section 40. The diagrams illustrate a normal optical fiber tape 1 in a normal state on the path.

The tape thickness measuring section 40 measures the thickness of the optical fibers 3 from the direction parallel to the tape plane on the path of the optical fiber tape 1. Herein, the expression "the tape plane on the path of the optical fiber tape 1" means the tape plane of the optical fiber tape 1 when a normal optical fiber tape 1 is in a normal state on the path. Therefore, in cases where, for example, the optical fiber tape 1 is inclined with respect to the path, the "tape plane on the path of the optical fiber tape 1" does not change and is the same plane (same position), but there is a difference between the "tape plane on the path of the optical fiber tape 1" and the actual tape plane.

The tape thickness measuring section 40 is disposed at the downstream side of the tension reducing section 30. Thus, the tape thickness measuring section 40 measures the thickness of the optical fiber tape 1 with reduced tension.

Figure 7A:
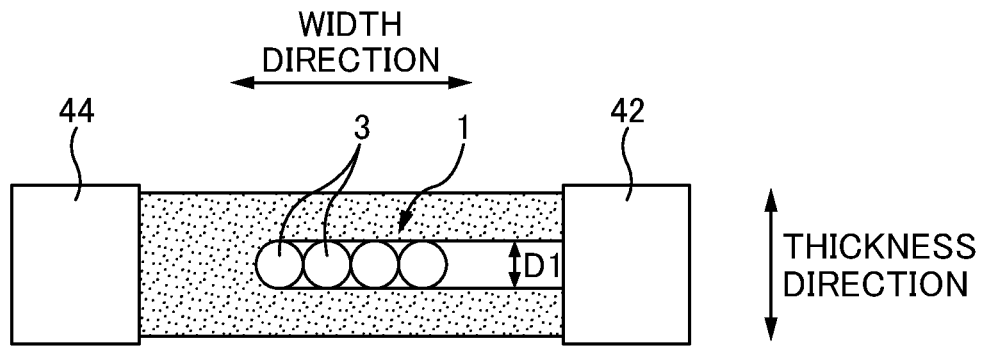
FIG. 7A is an explanatory diagram of a manner in which thickness of an intermittently-fixed optical fiber tape 1 having no difference in line length is measured.
Figure 7B:
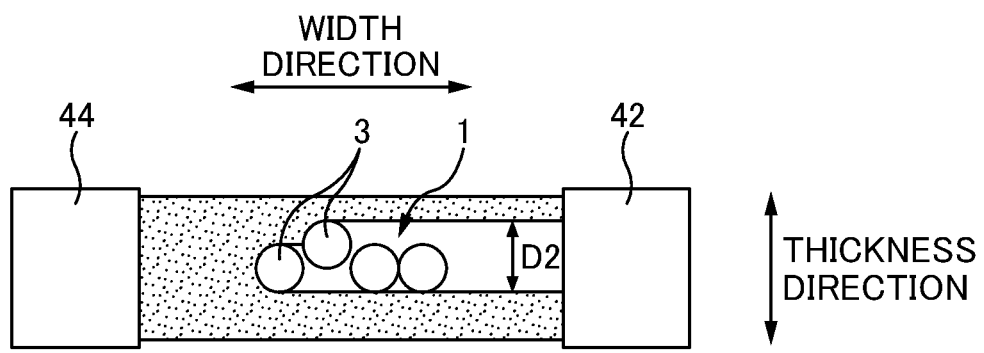
FIG. 7B is an explanatory diagram of a manner in which thickness of an intermittently-fixed optical fiber tape 1 having a line length difference is measured.

FIG. 7A is an explanatory diagram of a manner in which the thickness of an intermittently-fixed optical fiber tape 1 having no difference in line length is measured. FIG. 7B is an explanatory diagram of a manner in which the thickness of an intermittently-fixed optical fiber tape 1 having a line length difference is measured. As already explained, when there is a line length difference between the optical fibers of the intermittently-fixed optical fiber tape 1, the intermittently-fixed optical fiber tape 1 appears thicker as viewed along the tape width direction (a direction parallel to the tape plane of the optical fiber tape 1) when tension of the optical fiber tape 1 is reduced. Assuming that the tape thickness illustrated in FIG. 7A is D1 and the tape thickness illustrated in FIG. 7B is D2, by setting a threshold value Dth to be greater than D1 but less than D2 (D1<Dth<D2), the presence or absence of abnormalities (abnormalities in the tension applied to the optical fibers 3 or occurrences of a line length difference) can be detected by comparing the measurement result of the tape thickness measuring section 40 against the threshold value Dth.

Figure 7C:
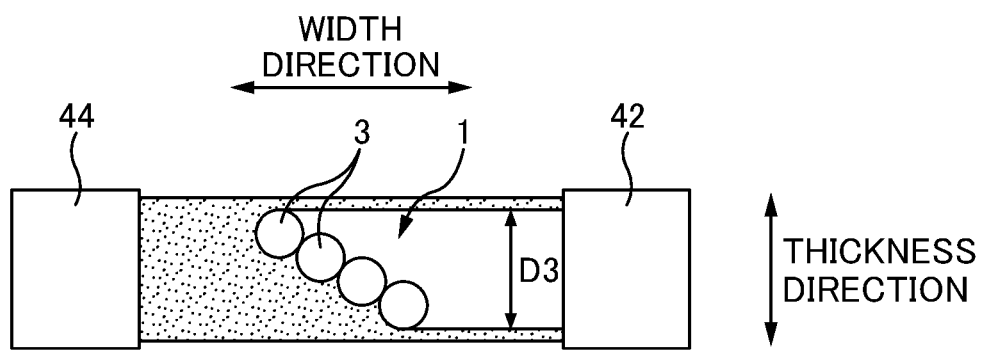
FIG. 7C is an explanatory diagram for a case in which the optical fiber tape 1 is inclined with respect to a path.

FIG. 7C is an explanatory diagram for a case in which the optical fiber tape 1 is inclined with respect to a path. When an optical fiber tape 1 having a line length difference under reduced tension (see the lower diagram of FIG. 5) is fed along the feed direction, sometimes a phenomenon (line deviation) occurs in which the optical fiber tape 1 jumps up from the path due to, for example, being affected by the meandering optical fibers 3, and the optical fiber tape 1 may become inclined with respect to the path, as illustrated in FIG. 7C. As a result, the tape thickness D3 as measured by the tape thickness measuring section 40 becomes thicker, even in cases where there is no change in the thickness in the optical fiber tape 1 itself. Accordingly, even in cases in which line deviation due to a line length difference between the optical fibers 3 has occurred, the presence or absence of abnormalities in the optical fibers (abnormalities intension applied to the optical fibers 3, or occurrence of a line length difference between the optical fibers 3) can be detected by comparing the measurement result of the tape thickness measuring section 40 against the threshold value Dth.

Figure 8:
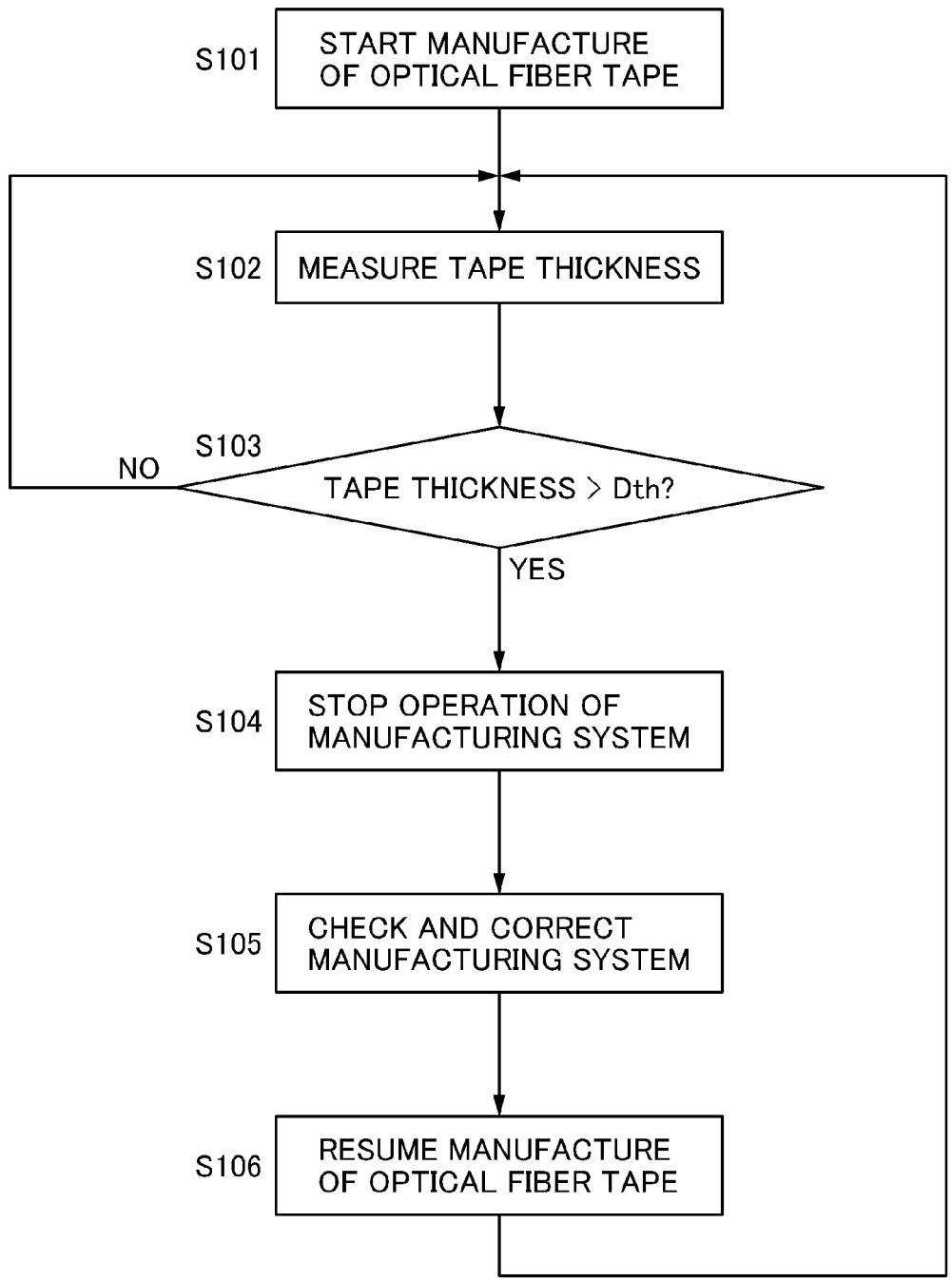
FIG. 8 is a flow diagram of manufacturing processing for an optical fiber tape 1.

FIG. 8 is a flow diagram of manufacturing processing for the optical fiber tape 1.

First, the controller 50 starts manufacture of the intermittently-fixed optical fiber tape 1 (S101). When this is performed, the controller 50 makes the tape forming section 20 form the intermittently-fixed optical fiber tape 1 while applying tension to the plurality of optical fibers 3, which are arranged parallel to each other.

Next, the controller 50 measures the thickness of the intermittently-fixed optical fiber tape 1 (S102). When this is performed, the controller 50 makes the tension reducing section 30 reduce the tension of the intermittently-fixed optical fiber tape 1, and the controller 50 makes the tape thickness measuring section 40 measure the thickness of the optical fiber tape 1 with reduced tension.

Next, the controller 50 compares the measured thickness (tape thickness) of the optical fiber tape 1 against the threshold value Dth (S103). The controller 50 continues manufacture of the optical fiber tape 1 as long as the tape thickness is less than the threshold value Dth (NO at S103).

In contrast thereto, the controller 50 stops operation of the manufacturing system 10 (S104) if the tape thickness is greater than the threshold value Dth (YES at S103). In cases in which the tape thickness is greater than the threshold value Dth, it is conceivable that there is an abnormality in the tension applied to the optical fibers 3, and that a line length difference has occurred between the optical fibers 3 configuring the optical fiber tape 1. Thus, by stopping operation of the manufacturing system 10, it is possible to suppress/prevent manufacture of an optical fiber tape 1 having a line length difference, and to suppress/prevent damage to, or breaks in, the optical fibers 3. Moreover, damage to the coating die 241 can also be suppressed/prevented by stopping operation of the manufacturing system 10.

After manufacture has been stopped, an operator checks and corrects the manufacturing system 10 (S105). In particular, since it is conceivable that there is an abnormality in the tension applied to the optical fibers 3, the operator checks and corrects the tension of the optical fibers 3 supplied into the coating die 241, the positional relationships between the coating die 241 and the optical fibers 3, and the like. In addition, the operator may discharge any static electricity on the coating die 241 or optical fibers 3, adjust the adhesive supply pressure in the coating die 241, etc.

The controller 50 resumes manufacture of the intermittently-fixed optical fiber tape 1 (S106) after the manufacturing system 10 has been checked and corrected at S105. After resuming, the controller 50 continues measuring the tape thickness of the intermittently-fixed optical fiber tape 1 (S102) and detection for abnormalities in the tape thickness (S103).

In the manufacturing processing described above, when an abnormality has been detected in the tape thickness (YES at S103), the controller 50 stops the operation of the manufacturing system 10 (S104) and the operator checks and corrects the manufacturing system 10 (S105). However, when an abnormality in the tape thickness has been detected (YES at S103), instead of stopping the operation of the manufacturing system 10, the controller 50 may automatically adjust the manufacturing system 10 (mainly the tape forming section 20), such as by lowering the line speed of the optical fibers 3, adjusting the tension of the optical fibers 3 supplied to the coating die 241, discharging any static electricity on the coating die 241 or the optical fibers 3, or adjusting the adhesive supply pressure in the coating die 241.

Figure 9:
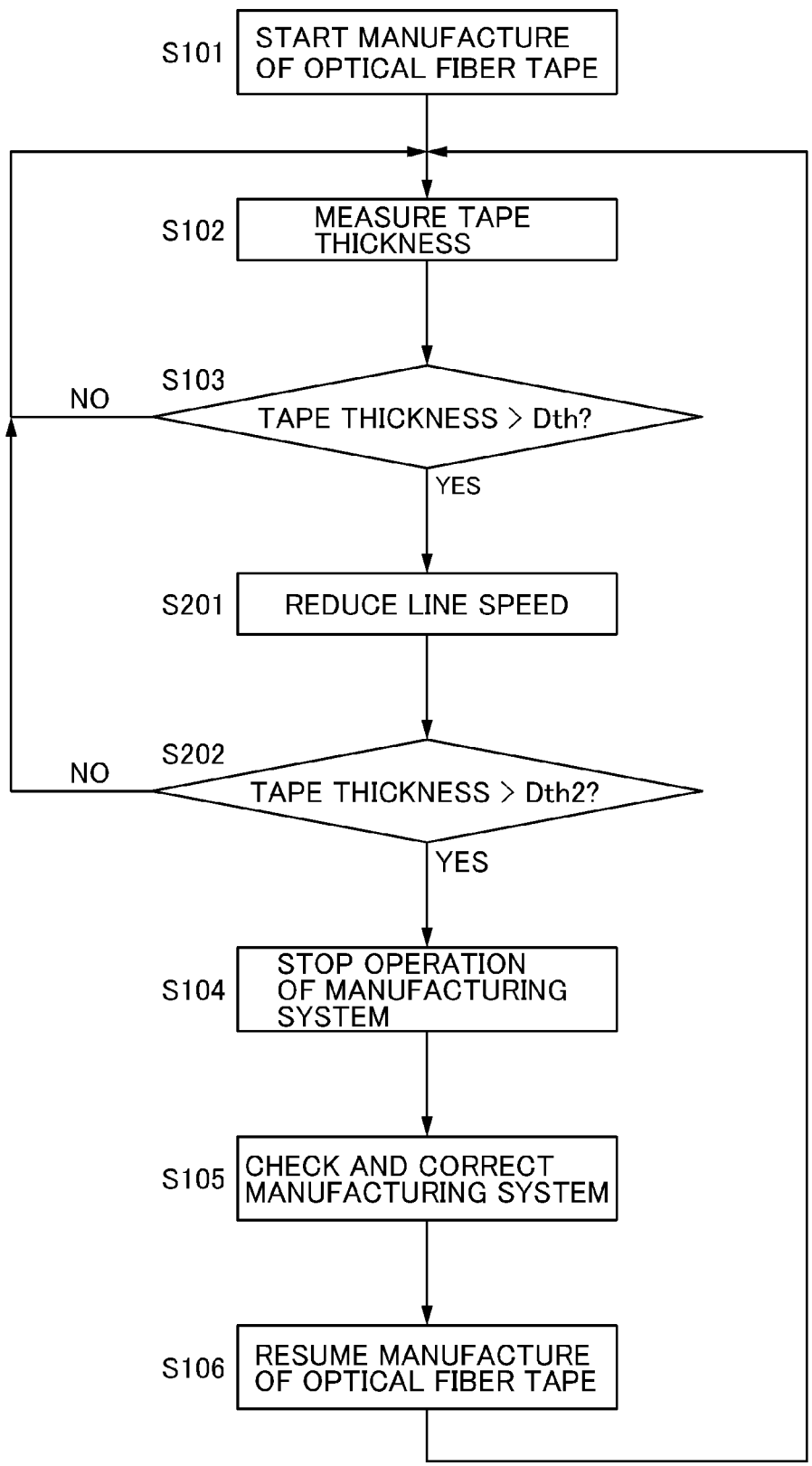
FIG. 9 is a flow diagram of a modified example of manufacturing processing for an optical fiber tape 1.

FIG. 9 is a flow diagram of a modified example of manufacturing processing for the optical fiber tape 1. In the modified example, when an abnormality has been detected in the tape thickness (YES at S103), the controller 50 does not immediately stop operation of the manufacturing system 10, but first lowers the line speed of the optical fibers 3 (S201). The controller 50 stops operation of the manufacturing system 10 (S104) in cases in which the tape thickness is greater than a second threshold value Dth2 (YES as S202) even with lowered line speed. This modified example enables operation of the manufacturing system 10 to continue as long as any abnormalities in the tape thickness are eliminated (NO at S202) when the line speed of the optical fibers 3 has been lowered (S201).

Example 1: (Measurement of Thickness of Intermittently-Fixed Optical Fiber Tape 1 Having No Difference in Line Length)

Using the manufacturing system 10 illustrated in FIG. 1, an intermittently-fixed optical fiber tape 1 including twelve strands having no difference in line length was formed while applying tension to the twelve optical fibers 3 arranged parallel to each other, and the thickness of the optical fiber tape 1 was measured using the tape thickness measuring section 40. The diameter of each optical fiber 3 employed was approximately 250 μm, the length of each connecting part 5 (which corresponds to the length L1 in FIG. 2) was 15 mm, and the length of each non-connecting part 7 (which corresponds to the length L2 in FIG. 2) was 17 mm. Three values were set for the tension of the optical fiber tape 1 in the tape thickness measuring section 40 (300 gf per 12 strands, 200 gf per 12 strands, 100 gf per 12 strands), and the tape thickness was measured for each tension.

The measurements results of tape thickness for the three values of tension were within the range of from 0.3 mm to 0.5 mm.

Example 2: (Measurement of Thickness of Intermittently-Fixed Optical Fiber Tape 1 Having Line Length Difference)

Using the manufacturing system 10 illustrated in FIG. 1, an intermittently-fixed optical fiber tape 1 including twelve strands was formed while applying tension to the twelve optical fibers 3 arranged parallel to each other, and the thickness of the optical fiber tape 1 was measured using the tape thickness measuring section 40. In order to induce a difference in line length, the intermittently-fixed optical fiber tape 1 including twelve strands was formed while applying a higher tension to the first optical fiber, among the optical fibers 3, than the other optical fibers 3, by applying additional load only to the first optical fiber 3 out of the twelve optical fibers 3 at the time of forming the intermittently-fixed optical fiber tape 1. The additional load was set to five values (0 gf, 50 gf, 100 gf, 150 gf, and 200 gf). After forming the intermittently-fixed optical fiber tape 1 formed while applying the additional load, the tension of the optical fiber tape 1 in the tension reducing section 30 was reduced to 100 gf per twelve strands, and the thickness (mm) of the optical fiber tape 1 was measured using the tape thickness measuring section 40.

In order to confirm that an intermittently-fixed optical fiber tape 1 having a line length difference was formed, the intermittently-fixed optical fiber tape 1 formed while applying the additional load to the first optical fiber 3 was cut to 10 m, and the length of each of the cut optical fibers (the twelve optical fibers 3) was measured. A value obtained by dividing the difference between the maximum length and minimum length measured for the optical fibers 3 by 10 m was taken as the line length difference (%). Note that the optical fiber 3 having the shortest length was the first optical fiber 3 applied with the additional load.

Figure 10:
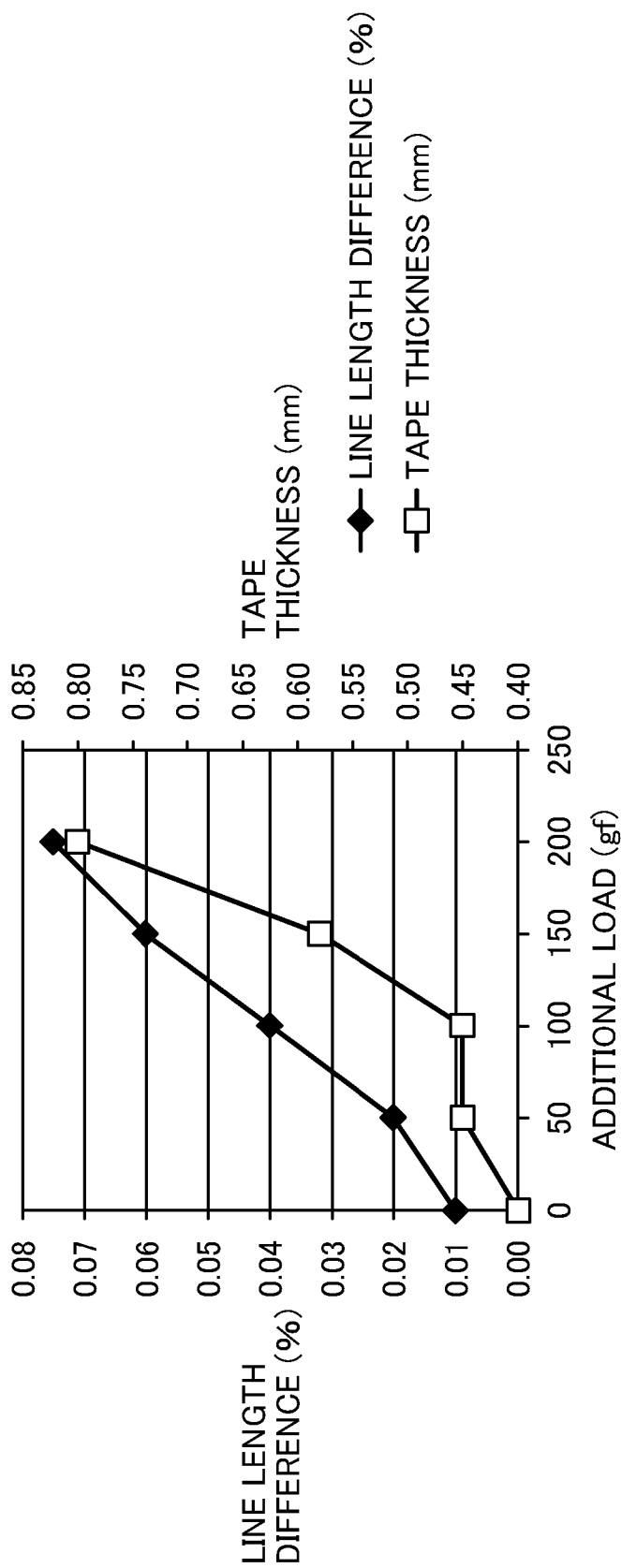
FIG. 10 is a graph of tape thickness and line length difference against additional load.

FIG. 10 is a graph of tape thickness and line length difference against additional load. The horizontal axis indicates the additional load (gf) applied only to the first optical fiber 3 out of the twelve optical fibers 3. The vertical axis at the right side indicates the tape thickness (mm). The vertical axis at the left side indicates the line length difference (%).

As the line length difference graph demonstrates, it was confirmed that the line length difference increases as the additional load increases. This is thought to be because the line length difference occurred due to the higher tension of a specific optical fiber 3 (in this case the first optical fiber 3) than the other optical fibers 3, when the specific optical fiber 3 was applied with the additional load.

As the graph of tape thickness demonstrates, it was confirmed that the measured thickness of the intermittently-fixed optical fiber tape 1 increases as the additional load increases. It was accordingly confirmed that the intermittently-fixed optical fiber tape 1 is measured to be thicker as the line length difference increases.

Accordingly, it was confirmed that an abnormality in the tension applied to the optical fibers 3, and a line length difference occurring between the optical fibers 3 configuring the optical fiber tape 1, can be detected based on the result of measuring the thickness of the intermittently-fixed optical fiber tape 1. Note that it was confirmed that an abnormality in the tension applied to the optical fibers 3, as well as an occurrence of a line length difference between the optical fibers 3 configuring the optical fiber tape 1 (for example, a line length difference of 0.05% or greater), can be detected based on the measured tape thickness, as long as the threshold value Dth at S103 of FIG. 8 is set to greater than 0.5 (for example, around 0.55), since the maximum measurement result of the thickness of an intermittently-fixed optical fiber tape 1 having no line length difference was 0.5 mm (Example 1).

{Others}

The foregoing embodiments are for facilitating the understanding of the present invention, and are not to be construed as to limit the present invention. Needless to say, the present invention may be modified and/or improved without departing from the gist thereof, and the present invention encompasses equivalents thereof.

Figure 11:
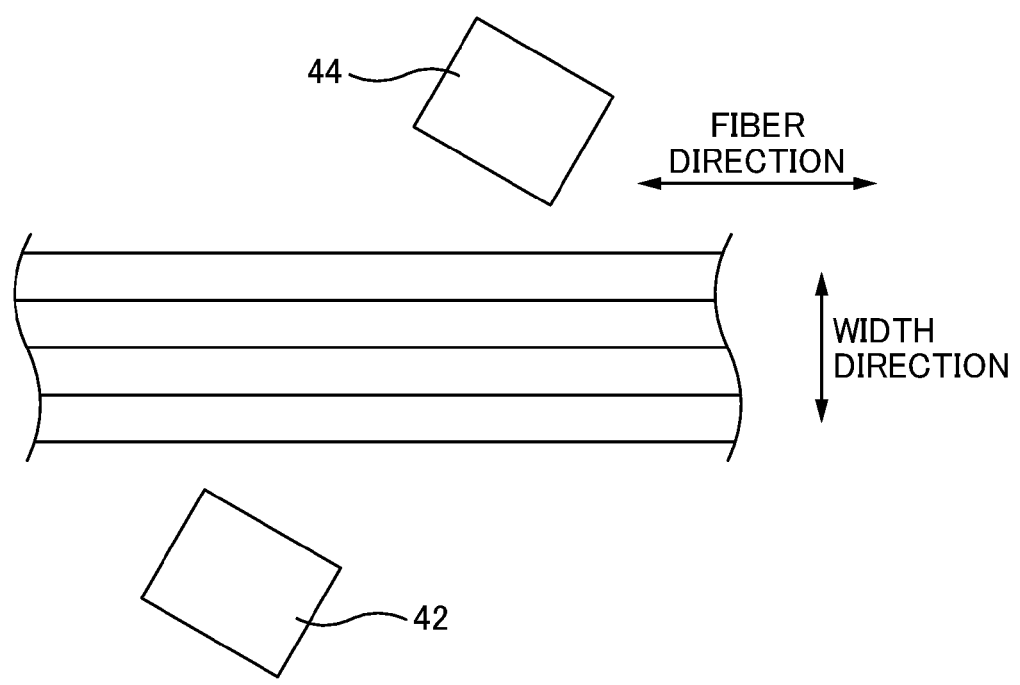
FIG. 11 is an explanatory diagram of another tape thickness measuring section 40.

In the exemplary embodiment described above, the CCD sensor 42 and the illuminating device 44 of the tape thickness measuring section 40 are disposed along a direction parallel to the tape width. However, as illustrated in FIG. 11, the CCD sensor 42 and the illuminating device 44 may be disposed at an angle with respect to the tape width direction. The tape thickness can be measured from a direction parallel to the tape plane on the path even with such a tape thickness measuring section 40.

REFERENCE SIGNS LIST

1: Optical fiber tape;
3: Optical fiber;
5: Connecting part;
7: Non-connecting part;
10: Manufacturing system;
20: Tape forming section;
22: Optical fiber feeder;
24: Adhesive applicator;
241: Coating die;
242: Optical fiber insertion holes;
244: Intermittent applicator;
244A: Adhesive removing section;
244B: Shutter;
26: Light source;
26A: Semi-curing light source;

26B: Full-curing light source;
30: Tension reducing section;
31: Dancer roller;
40: Tape thickness measuring section;
42: CCD camera;
44: Illuminating device;
50: Controller;
61: Pull-in unit;
62: Take-up unit.

The invention claimed is:

1. A manufacturing method for an optical fiber tape, the method comprising:
    forming connecting parts that connect together adjacent optical fibers among a plurality of optical fibers arranged in a tape width direction and parallel to each other, while applying tension to the plurality of optical fibers, and thus forming an optical fiber tape in which the connecting parts are intermittently disposed;
    reducing the tension applied to the optical fiber tape; and
    measuring a thickness of the optical fiber tape with reduced tension from a direction parallel to a tape plane on a path of the optical fiber tape, said thickness being in a direction perpendicular to a tape plane of the optical fiber tape, said tape plane being parallel to the tape width direction and being a plane formed by arranging the plurality of optical fibers parallel to each other.

2. The manufacturing method for an optical fiber tape according to claim 1, wherein an abnormality in the tension applied to the plurality of optical fibers is detected based on the thickness of the optical fiber tape that has been measured.

3. The manufacturing method for an optical fiber tape according to claim 1, wherein an abnormality in line length difference in the plurality of optical fibers configuring the optical fiber tape is detected based on the thickness of the optical fiber tape that has been measured.

4. The manufacturing method for an optical fiber tape according to claim 1, wherein the forming of the optical fiber tape is controlled based on the thickness of the optical fiber tape that has been measured.

5. The manufacturing method for an optical fiber tape according to claim 4, wherein the forming of the optical fiber tape is stopped based on the thickness of the optical fiber tape that has been measured.

6. The manufacturing method for an optical fiber tape according to any one of claim 1, wherein:
    a pull-in unit is disposed between a tape forming section that forms the optical fiber tape and a tension reducing section that reduces tension applied to the optical fiber tape, the pull-in unit pulling in the optical fiber tape from the tape forming section; and
    a tension of the optical fiber tape at an upstream side of the pull-in unit is made to be different from a tension of the optical fiber tape at a downstream side of the pull-in unit.

7. An abnormality detection method comprising:
    forming connecting parts that connect together adjacent optical fibers among a plurality of optical fibers arranged parallel to each other while applying tension to the plurality of optical fibers, and thus forming an optical fiber tape in which the connecting parts are intermittently disposed;
    reducing the tension applied to the optical fiber tape;
    measuring a thickness of the optical fiber tape with reduced tension from a direction parallel to a tape plane on a path of the optical fiber tape; and
    detecting an abnormality in the tension applied to the plurality of optical fibers based on the thickness of the optical fiber tape that has been measured.

8. An abnormality detection method comprising:
    forming connecting parts that connect together adjacent optical fibers among a plurality of optical fibers arranged parallel to each other while applying tension to the plurality of optical fibers, and thus forming an optical fiber tape in which the connecting parts are intermittently disposed;
    reducing the tension applied to the optical fiber tape;
    measuring a thickness of the optical fiber tape with reduced tension from a direction parallel to a tape plane on a path of the optical fiber tape; and
    detecting an abnormality in line length difference in the plurality of optical fibers configuring the optical fiber tape based on the thickness of the optical fiber tape that has been measured.

9. A manufacturing system for an optical fiber tape, the system comprising:
    a tape manufacturing device that forms connecting parts for connecting together adjacent optical fibers among a plurality of optical fibers arranged in a tape width direction and parallel to each other, while applying tension to the plurality of optical fibers, and thus forms an optical fiber tape in which the connecting parts are intermittently disposed;
    a dancer roller that reduces the tension applied to the optical fiber tape; and
    a sensor that measures a thickness of the optical fiber tape with reduced tension from a direction parallel to a tape plane on a path of the optical fiber tape, said thickness being in a direction perpendicular to the tape plane of the optical fiber tape, said tape plane being parallel to the tape width direction and being a plane formed by arranging the plurality of optical fibers parallel to each other.

10. The manufacturing system for an optical fiber tape according to claim 9, wherein:
    a pull-in unit is disposed between the tape manufacturing device and the dancer roller; and
    a tension of the optical fiber tape at an upstream side of the pull-in unit is made to be different from a tension of the optical fiber tape at a downstream side of the pull-in unit.

11. A manufacturing system for an optical fiber tape, the system comprising:
    a tape manufacturing device manufacturing an intermittently-fixed optical fiber tape, said intermittently-fixed optical fiber tape including a plurality of optical fibers, said plurality of optical fibers being arranged in a tape width direction and parallel to each other, adjacent ones of said plurality of optical fibers being connected by intermittently-disposed connecting parts;
    a dancer roller; and
    a sensor arranged in a direction parallel to a tape plane of the intermittently-fixed optical fiber tape, said sensor measuring a thickness of the intermittently-fixed optical fiber tape whose tension has been reduced by the dancer roller, said thickness being in a direction perpendicular to a tape plane of the intermittently-fixed optical fiber tape, said tape plane being parallel to the tape width direction and being a plane formed by arranging the plurality of optical fibers parallel to each other.

12. The manufacturing system for an optical fiber tape according to claim 11, wherein:

a pull-in unit is disposed between the tape manufacturing device and the dancer roller; and
a tension of the intermittently-fixed optical fiber tape at an upstream side of the pull-in unit is made to be different from a tension of the intermittently-fixed optical fiber tape at a downstream side of the pull-in unit.

* * * * *